(12) United States Patent
Li

(10) Patent No.: US 6,348,281 B1
(45) Date of Patent: Feb. 19, 2002

(54) ELECTROCHEMICAL CELL HAVING VENTING COVER

(75) Inventor: Huaxin Li, Avon Lake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/443,817

(22) Filed: Nov. 19, 1999

(51) Int. Cl.$^7$ ................................................ H01M 2/04
(52) U.S. Cl. ........................... 429/53; 429/177; 429/82; 429/56
(58) Field of Search .............................. 429/57, 53, 56, 429/82, 177

(56) References Cited

U.S. PATENT DOCUMENTS

| | | | |
|---|---|---|---|
| 2,479,798 A | | 8/1949 | Williams, Jr. ................ 136/178 |
| 2,525,436 A | | 10/1950 | Williams, Jr. ................ 136/108 |
| 3,219,488 A | * | 11/1965 | Southworth ................... 429/56 |
| 4,010,044 A | | 3/1977 | Schaumburg ................... 429/82 |
| 4,175,166 A | | 11/1979 | Rosansky ..................... 429/56 |
| 4,191,806 A | * | 3/1980 | Levy ......................... 429/56 |
| 4,256,812 A | | 3/1981 | Tamura et al. ................ 429/56 |
| 4,486,514 A | | 12/1984 | Chaney, Jr. .................. 429/56 |
| 4,601,959 A | | 7/1986 | Romero ....................... 429/56 |
| 4,610,370 A | * | 9/1986 | Patterson et al. ............ 220/207 |
| 4,698,282 A | | 10/1987 | Mantello ..................... 429/56 |
| 4,702,976 A | | 10/1987 | Bowsky et al. ............... 429/181 |
| 4,789,608 A | | 12/1988 | Oswald ....................... 429/56 |
| 4,803,136 A | * | 2/1989 | Bowsky et al. ................ 429/56 |
| 4,842,965 A | | 6/1989 | Urushiwara et al. ............ 429/56 |
| 5,667,912 A | | 9/1997 | Georgopoulos ................ 429/170 |
| 5,677,076 A | * | 10/1997 | Sato et al. .................. 429/56 |
| 6,063,518 A | * | 5/2000 | Dewulf et al. ................ 429/53 |

FOREIGN PATENT DOCUMENTS

| | | | |
|---|---|---|---|
| JP | 02284350 | 11/1990 | ............ H01M/2/04 |
| JP | 04215245 | 8/1992 | ............ H01M/2/36 |
| JP | 10214609 | 8/1998 | ............ H01M/2/12 |
| JP | 10247483 | 9/1998 | ............ H01M/2/12 |
| JP | 10284035 | 10/1998 | ............ H01M/2/12 |
| JP | 11086819 | 3/1999 | ............ H01M/2/12 |
| JP | 11224659 | 8/1999 | ............ H01M/2/12 |
| JP | 11250886 | 9/1999 | ............ H01M/2/12 |
| WO | 9945603 | 9/1999 | ............ H01M/2/12 |

OTHER PUBLICATIONS

D1 Can Specification Sheet (1 page).

* cited by examiner

Primary Examiner—Gabrielle Brouillette
Assistant Examiner—M. Wills
(74) Attorney, Agent, or Firm—Russell H. Toye, Jr.; Robert W. Welsh

(57) ABSTRACT

An electrochemical cell having a can with a bottom end and an open top end, and positive and negative electrodes disposed in the can. The cell includes an inner metal cover inserted in the open end of the can for closing the open end of the can. The inner metal cover has a pressure relief mechanism for providing pressure relief to vent high pressure gases upon reaching a predetermined pressure. In addition, an outer cover is preferably positioned over the metal cover to form an electrical contact terminal and to substantially cover the pressure relief mechanism. The pressure relief mechanism advantageously provides for high pressure gas venting while minimizing the amount of volume consumed by the venting components and thereby allowing for a greater amount of electrochemically active materials in the can.

18 Claims, 2 Drawing Sheets

ELECTROCHEMICAL CELL HAVING VENTING COVER

BACKGROUND OF THE INVENTION

The present invention generally relates to electrochemical cells, i.e., batteries, and more particularly, to a closure assembly for closing the open end of a battery container and having a pressure relief mechanism for venting when exposed to excessive pressure.

Conventional alkaline electrochemical cells generally include a steel cylindrical can having a positive electrode, referred to as the cathode, which comprises manganese dioxide as the active material. The electrochemical cell also includes a negative electrode, referred to as the anode, which comprises zinc powder as the active material. In bobbin-type cell constructions, the cathode is typically formed against the interior surface of the steel can, while the anode is generally centrally disposed in the can. Alternately, in jelly-roll cells, the anode and cathode are spirally wound. A separator is located between the anode and the cathode, and an alkaline electrolyte solution simultaneously contacts the anode, the cathode, and the separator. A conductive current collector is commonly inserted into the anode active material, and a seal assembly, which includes a seal member, provides closure to the open end of the steel can to seal the active electrochemical materials in the sealed volume of the can.

Cylindrical alkaline cells are commonly sealed closed by placing a preassembled collector assembly in the open end of the steel can. The collector assembly typically includes a collector nail, an annular nylon seal, and an inner metal cover for supporting the nylon seal. The can typically has a taper or bead at its open end which serves to support the collector assembly in a desired orientation prior to securing it in place. After the collector assembly has been inserted, an outer metal cover is placed over the collector assembly and is secured in place by radially squeezing the can against the collector assembly and crimping the edge of the can over the peripheral lip of the collector assembly to secure the outer cover and collector assembly within the open end of the can. However, electrochemical cells commonly employ electrochemically active materials, such as zinc, which generate hydrogen gas during storage and sometimes during or following service use. When the battery can is sealed closed, excessive build-up of high pressure gases within the sealed can may cause damage to the cell and/or the device in which the cell is employed. "Very high pressure gasses are gasses at or above the predetermined pressure which may cause damage to the cell or device in which it is used".

One approach to avoiding a potentially excessive build-up of pressure in a cell has been to employ a resealable valve system that periodically releases excessive gas pressure from within the active cell volume. However, the continued periodic release of gas pressure may, in some situations, permit the release of electrolyte solution containing salts and other particulate matter, which may foul the resealable valve, and generally requires additional costly components that are typically quite voluminous. Other more widely acceptable approaches to venting excessive pressure have included the use of a vent formed in the annular nylon seal, which is intended to rupture upon experiencing an excessive pressure build-up in the cell. For example, U.S. Pat. No. 5,667,912 discloses a current collector assembly having a low profile seal with a thinned portion which is intended to shear when the internal pressure exceeds a predetermined pressure.

The conventional battery seals equipped with vents typically employ a circular thinned region formed in the annular nylon seal. However, the amount of space occupied by the seal and its corresponding current collector, inner metal cover, and outer metal cover, can be significant. The greater the space occupied by the seal and collector assembly, the less space that there is available within the cell for the electrochemically active materials. Consequently, a reduction in the amount of electrochemically active materials that may be provided within the cell results in a shorter service life for the cell. It is therefore desirable to maximize the internal volume within an electrochemical cell that is available for the electrochemically active components.

SUMMARY OF THE INVENTION

The present invention improves the protective safeguards of an electrochemical cell with an enhanced pressure relief mechanism that allows for use of a low profile seal assembly for sealing the open end of the cell container. To achieve this and other advantages, and in accordance with the purpose of the invention as embodied and described herein, the present invention provides for an electrochemical cell having a container with a bottom end, and an open top end, and positive and negative electrodes disposed in the container. The cell further includes an inner metal cover inserted in the open end of the container for closing the open end of the container. The inner metal cover has a pressure relief mechanism for providing pressure relief to vent high pressure gases upon reaching a predetermined pressure. In addition, an outer metal cover is positioned over the inner metal cover to form an electrical contact terminal and to substantially cover the pressure relief mechanism. The pressure relief mechanism advantageously provides for high pressure gas venting while minimizing the amount of volume consumed by the venting components and thereby allowing for a greater amount of electrochemically active materials in the container.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
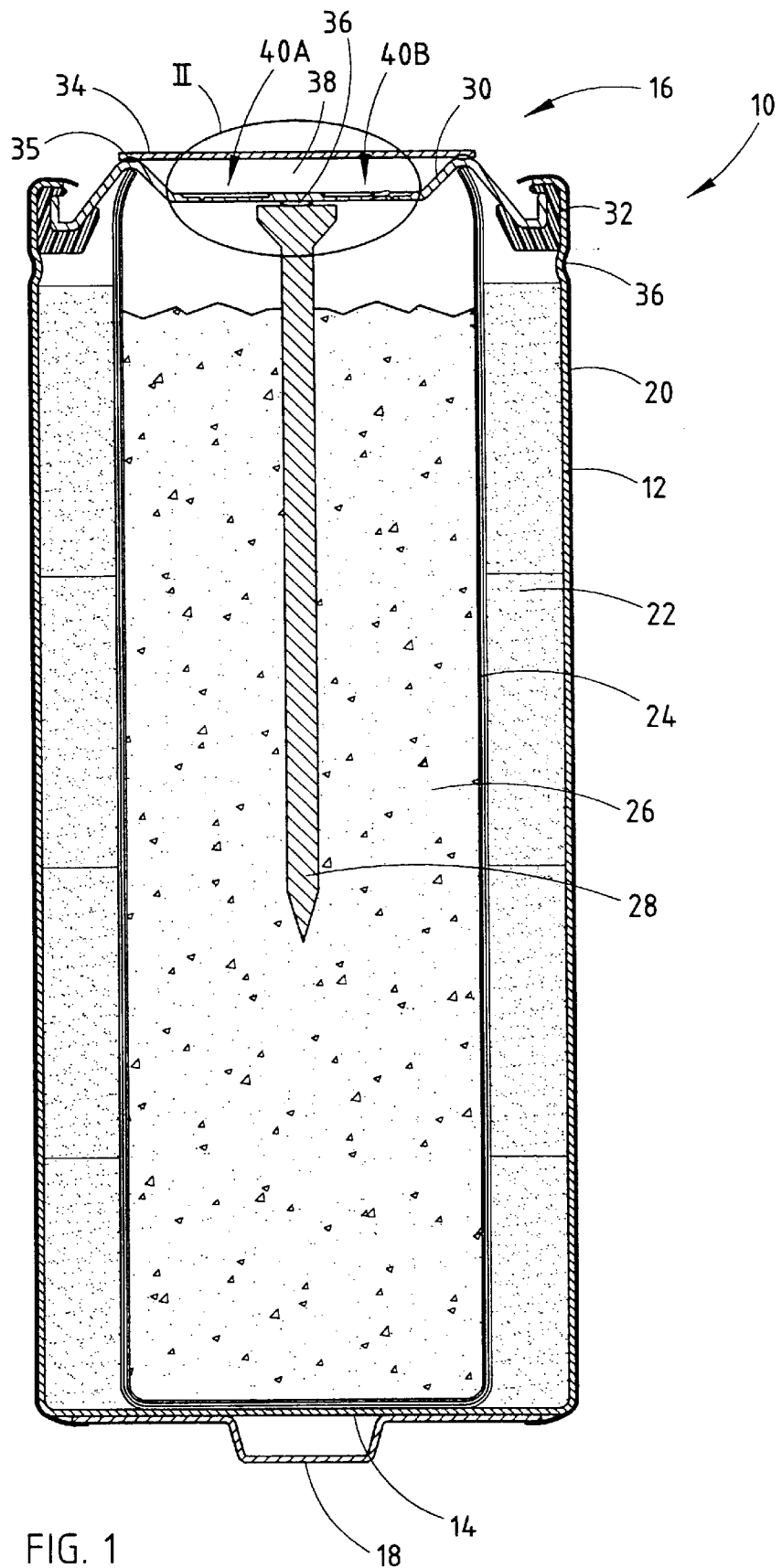
FIG. 1 is a longitudinal cross-sectional view of an electrochemical cell having a pair of pressure relief mechanisms formed in an inner metal cover according to the present invention.

Referring to FIG. 1, a cylindrical alkaline electrochemical cell 10 is shown therein having a pair of pressure relief mechanisms 40A and 40B formed in an inner metal cover 30 according to the present invention. The electrochemical cell 10 includes a cylindrical steel can 12 having a closed bottom end 14, an open top end 16, and side walls extending between the top and bottom ends. The closed bottom end of can 12 further includes a positive cover 18 welded or otherwise attached thereto and formed of plated steel, with a protruding nub at its center region, which forms the positive contact terminal of cell 10. Assembled to the open top end 16 of steel can 12 is a conductive inner cover 30 which substantially closes the open end of steel can 12. Assembled onto the inner metal cover 30 is a conductive outer cover 34 which substantially covers the top side of inner cover 30 and forms the negative contact terminal of cell 10. According to one embodiment, outer cover 34 is welded or otherwise attached to inner metal cover 30. According to this embodiment, inner metal cover 30 and outer contact terminal 34 are electrically coupled to each other. However, it should be appreciated that inner metal cover 30 could be electrically insulated from outer metal cover 34, such as to provide a neutral cover, for example.

A metalized, plastic film label 20 is formed about the exterior surface of steel can 12, except for the ends of steel can 12. Film label 20 is formed over the peripheral edge of the positive cover 18 and may extend partially onto the outer negative cover 34 as shown.

A cathode 22 is formed about the interior surface of steel can 12. Cathode 22 may be formed of a mixture of manganese dioxide, graphite, potassium hydroxide solution, and additives, according to one example. A separator 24, which may be formed of a non-woven fabric that prevents migration of any solid particles in the cell, is disposed about the interior surface of cathode 22. An anode 26 is disposed with an electrolyte into the separator 24 and in contact with a current collector 28 which may include a brass nail having an elongated body and an enlarged head at one end. The anode 26 may be formed of zinc powder, a gelling agent, and additives, according to one example. Accordingly, the cathode 22 is configured as the positive electrode, and the anode 26 is configured as the negative electrode. While a bobbin-type cell construction is shown, it should be appreciate that the electrochemical cell 10 may be otherwise constructed, such as a jelly-roll construction.

The inner metal cover 30 is preferably formed of plated steel, and may be held in contact with current collector 28 via a weld 36 or pressurized contact. A ring-shaped nylon seal 32 having a J-shaped cross section, or alternately an L-shaped cross section, is disposed in the top open end 16 of steel can 12 to provide a seal between the steel can 12 and inner metal cover 30 to prevent the leakage of electrochemically active cell materials contained in the steel can 12. The assembly of the seal 32 may include disposing the seal 32 in the open end 16 of steel can 12 on top of a bead 46 that is formed radially inward on the inner walls of can 12, or alternately against a tapered wall, and crimping the upper end of can 12 radially inward and over the outer periphery of the seal 32 to compress it against bead 46. Therefore, the nylon seal 32 is compressed between the peripheral edge of inner metal cover 30 and upper end walls of steel can 12. It should be appreciated that the inner metal cover 30 and outer cover 34 are electrically insulated from the steel can 12 by way of nylon seal 32.

According to the present invention, the inner metal cover 30 has a pair of pressure relief mechanisms 40A and 40B integrally formed therein which include stress concentration grooves 44A and 44B, which provide pressure relief when exposed to an excessive pressure differential. Cell 10 has two pressure relief mechanism 40A and 40B located between the center and outer perimeter of inner metal cover 30. Pressure relief mechanisms 40A and 40B are preferably equi-angularly spaced. According to the embodiment shown, pressure mechanisms 40A and 40B are angularly offset 180 degrees from each other. It should also be appreciated that the inner metal cover 30 may include any number of pressure relief mechanisms. For example, three equi-angularly spaced pressure release mechanisms could be located in the inner metal cover 30 and angularly offset 120 degrees from each other.

Figure 2:
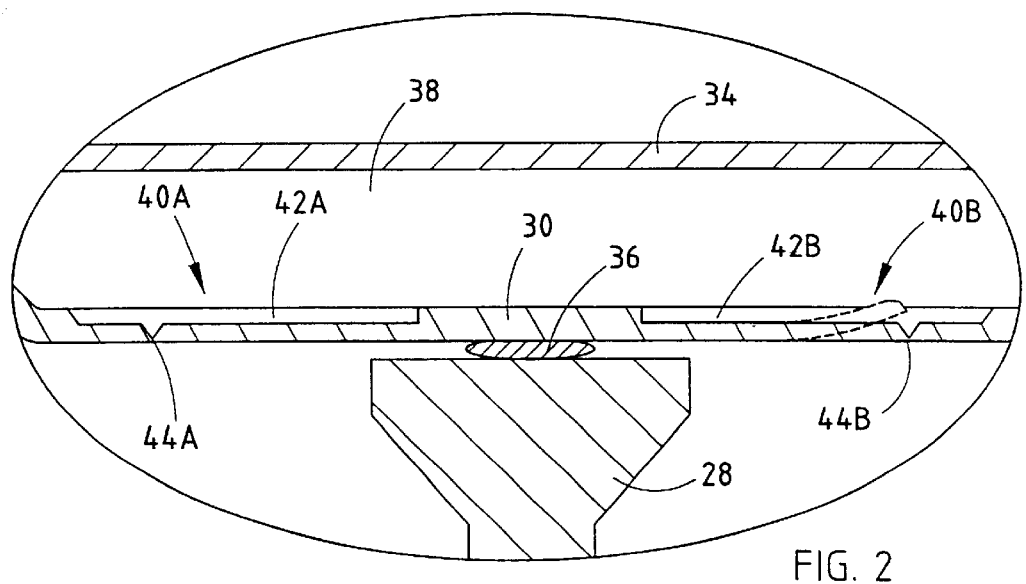
FIG. 2 is an enlarged sectional view taken from section II in FIG. 1, which further illustrates the pressure relief mechanisms.
Figure 3:
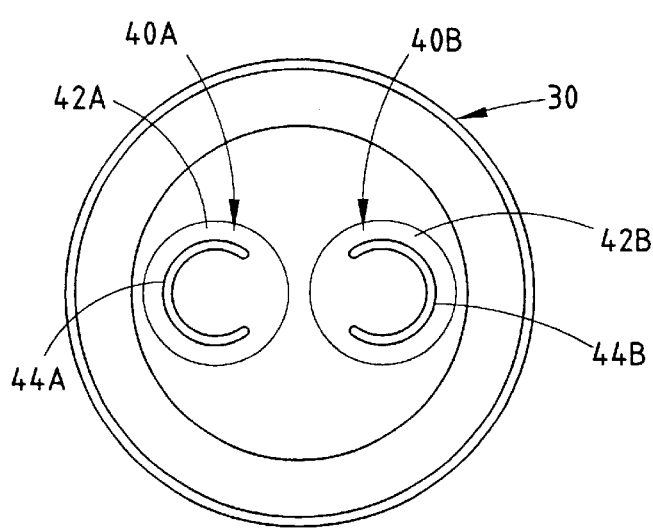
FIG. 3 is a top view of the inner metal cover further illustrating the pressure relief mechanisms.
Figure 4:
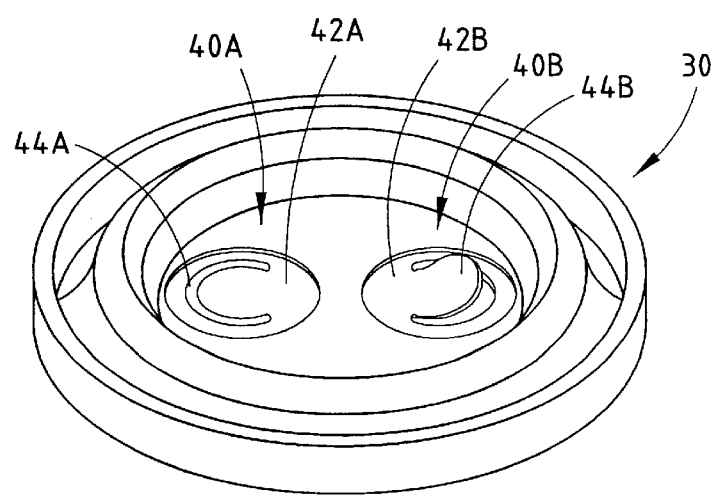
FIG. 4 is a perspective view of the inner metal cover illustrated in a vented state.

Referring to FIGS. 2–4, the pressure relief mechanisms 40A and 40B each have a coined groove 44A and 44B, respectively, with a reduced thickness that is intended to shear and fracture when exposed to a predetermined pressure differential to release high pressure gas from within the sealed active volume of cell 10. The pressure relief mechanisms 40A and 40B are separated from outer cover 34 via open space 38 which provides room for the pressure relief mechanism to open to vent gas during a vent condition. As a result of forming the pressure relief mechanisms 40A and 40B in the inner metal cover 30, complex and voluminous collector/seal assemblies may be replaced with collector assemblies that consume less volume and have fewer parts. Thus, a significant improvement in internal volume efficiency may be obtained.

Each of the pressure relief mechanisms 40A and 40B may be formed by coining the respective grooves 44A and 44B in either the top and/or bottom surface of inner metal cover 38 according to one embodiment. The stress concentration grooves 44A and 44B may be arcuate shaped through an approximately 300 degree rotation to provide a C-shape, thereby leaving a hinge at the remaining 60 degree of rotation. Accordingly, pressure relief mechanisms 40A and 40B may fracture along the corresponding grooves 44A and 44B throughout a 300 degree rotation, while hinging and remaining connected at the hinge. Each of pressure relief mechanisms 40A and 40B further includes a reduced thickness section 42A and 42B in which the stress concentration grooves 44A and 44B are formed. Sections 42A and 42B are generally circular in shape and surround the stress concentration grooves 44A and 44B and have a thickness less than the remainder of the inner metal cover 30. It should be appreciated that by providing reduced thickness sections 42A and 42B, the space 38 between the outer cover 34 and inner metal cover 30 may be reduced, and yet provide adequate space 38 for the pressure relief mechanisms 40A and 40B to vent.

Unlike conventional pressure relief mechanisms of the prior art, the stress concentration pressure relief mechanisms 40A and 40B of the present invention are positioned beneath outer cover 34 so as to prevent the electrochemical materials from spraying directly outward from the cell 10 upon rupture. To allow for release of vented gas to the outside atmosphere, the outer cover 34 has one or more openings provided between adjacent welds 35. Additionally, recessed gaps or ribs could be provided on either the bottom surface of outer cover 34 and/or upper surface of inner metal cover 30 to provide an air flow gap. Also, if the cell 10 were used in series with another battery such that the end of the negative terminal of the cell 10 is pressed against the positive terminal of another cell, the provision of the outer cover 34 over pressure relief mechanisms 40A and 40B allows mechanisms 40A and 40B to bow outwardly under the outer protrusion and ultimately rupture. If outer cover 34 was not present during such circumstances, the contact between the two cells may otherwise prevent one or more of the pressure relief mechanisms 40A and 40B from rupturing. Further, if the outer cover 34 were not provided over pressure relief mechanisms 40A and 40B, the pressure relief mechanisms 40A and 40B at the negative end of the cell 10 would be more susceptible to damage. Outer cover 34 also shields pressure relief mechanisms 40A and 40B from the corrosive effects of the ambient environment and therefore reduces the possibility of premature venting and/or leakage. Thus, by forming the pressure relief mechanisms 40A and 40B under the outer cover 34, the present invention overcomes problems associated with the prior art constructions, and thus represents a commercially feasibly pressure relief mechanism for a cell.

Due to the formation of pressure relief mechanisms 40A and 40B in the inner metal cover 30, the need for a complex and voluminous collector/seal assembly is eliminated, and instead the open end 16 of the can 12 may be sealed using low volume seal construction techniques that were not previously feasible due to the need to allow gases to escape through the pressure relief mechanisms 40A and 40B to the exterior of the cell 10.

With particular reference to FIG. 4, the inner metal cover 30 is further illustrated with pressure relief mechanism 40A in a non-vented state and pressure relief mechanism 40B in a vented state. As shown, stress concentration groove 44B fractures and bows outward so as to hinge at the area of non-reduced thickness. While only one of the pressure relief mechanisms 40A and 40B is shown open, it should be appreciated that one or more may vent upon reaching the predetermined venting pressure.

Accordingly, the pressure relief mechanisms 40A and 40B advantageously provide for high pressure gas venting while minimizing the amount of volume consumed by the venting components and collector and seal assembly, and thereby allows for a greater amount of electrochemically active materials in the cell 10.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
   a container having a bottom end and an open top end;
   a positive electrode disposed in said container;
   a negative electrode disposed in said container; and
   a seal assembly disposed in the open end of the container for closing the open end of the container, said seal assembly consisting essentially of a seal member, an inner metal cover having a pressure relief mechanism formed therein for providing pressure relief to vent high pressure gases upon reaching a predetermined pressure, and an outer cover disposed over said inner metal cover and substantially covering the pressure relief mechanism.

2. The electrochemical cell as defined in claim 1, wherein said pressure relief mechanism comprises at least two stress concentration grooves formed in a surface of said inner metal cover.

3. The electrochemical cell as defined in claim 1 further comprising a reduced thickness section formed in said inner metal cover and surrounding the pressure relief mechanism.

4. The electrochemical cell as defined in claim 1, wherein said pressure relief mechanism is formed in a region between the center and outer perimeter of the inner metal cover.

5. The electrochemical cell as defined in claim 1, wherein said inner metal cover comprises steel.

6. The electrochemical cell as defined in claim 1, wherein said outer cover is spaced from said inner cover in a region above said pressure relief mechanism.

7. The electrochemical cell as defined in claim 1 further comprising a ring-shaped seal disposed between said inner metal cover and said container.

8. The electrochemical cell as defined in claim 1, wherein said outer cover comprises metal and is electrically coupled to said inner metal cover.

9. The electrochemical cell as defined in claim 1, wherein said pressure relief mechanism comprises a C-shaped groove.

10. The electrochemical cell as defined in claim 1, wherein said outer cover comprises a negative contact terminal.

11. An electrochemical cell comprising:
    a container having a bottom end and an open top end, and containing electrochemically active materials; and
    a seal assembly disposed in the open end of said container for closing the open end of the container, said seal assembly consisting essentially of a seal member, an inner metal cover having at least one stress concentration groove formed therein for providing pressure relief to vent high pressure gases upon reaching a predetermined pressure, and an outer cover disposed over said inner metal cover and substantially covering the stress concentration groove, wherein said outer cover is spaced from said inner cover in a region above the stress concentration groove to provide a space between the stress concentration groove and the outer cover to allow for venting of high pressure gases.

12. The electrochemical cell as defined in claim 11 further comprising another stress concentration groove formed in said inner metal cover for providing pressure relief to vent high pressure gases upon reaching a predetermined pressure.

13. The electrochemical cell as defined in claim 11 further comprising a reduced thickness section formed in the top surface of said inner metal cover and surrounding said stress concentration groove.

14. The electrochemical cell as defined in claim 11, wherein said inner metal cover comprises steel.

15. The electrochemical cell as defined in claim 11, wherein said outer cover comprises metal and is electrically coupled to said inner metal cover.

16. The electrochemical cell as defined in claim 11, wherein said outer cover comprises a negative contact terminal.

17. The electrochemical cell as defined in claim 11, wherein said cell further comprises:
    an aqueous alkaline electrolyte;
    a positive electrode formed about an interior surface of said container;
    a separator disposed about an interior surface of said positive electrode; and
    a negative electrode disposed within said separator in a bobbin-type configuration.

18. The electrochemical cell as defined in claim 1, wherein said cell further comprises:
    an aqueous alkaline electrolyte;
    a positive electrode formed about an interior surface of said container;
    a separator disposed about an interior surface of said positive electrode; and
    a negative electrode disposed within said separator in a bobbin-type configuration.

* * * * *